Nov. 3, 1931. C. RORABECK 1,829,874
TRACTOR SPROCKET
Filed Sept. 28, 1928 2 Sheets-Sheet 1
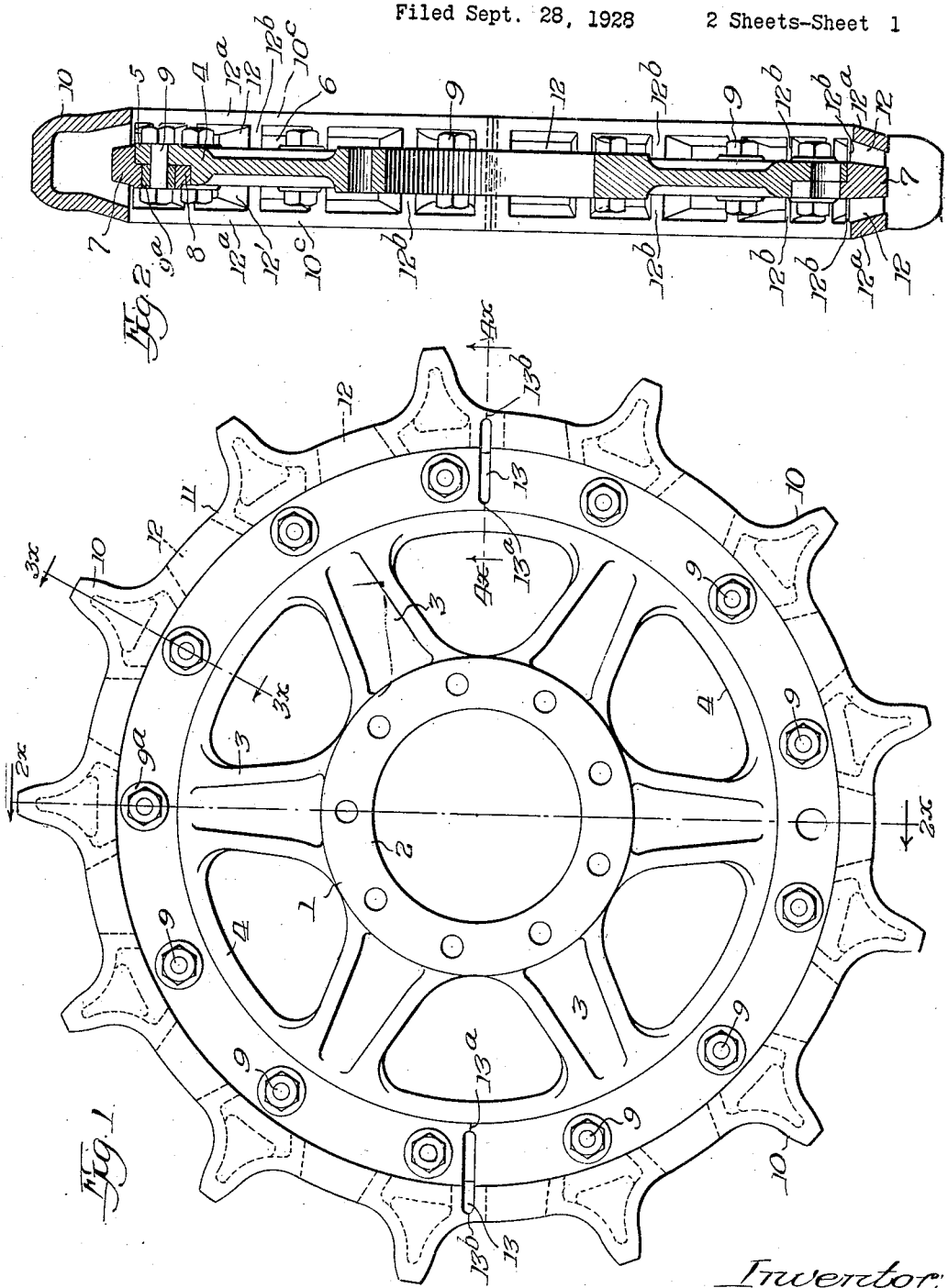
Inventor:
Claude Rorabeck.
By Wilkinson, Hurley, Byron & Knight
Attys.

Nov. 3, 1931.  C. RORABECK  1,829,874
TRACTOR SPROCKET
Filed Sept. 28, 1928  2 Sheets-Sheet 2
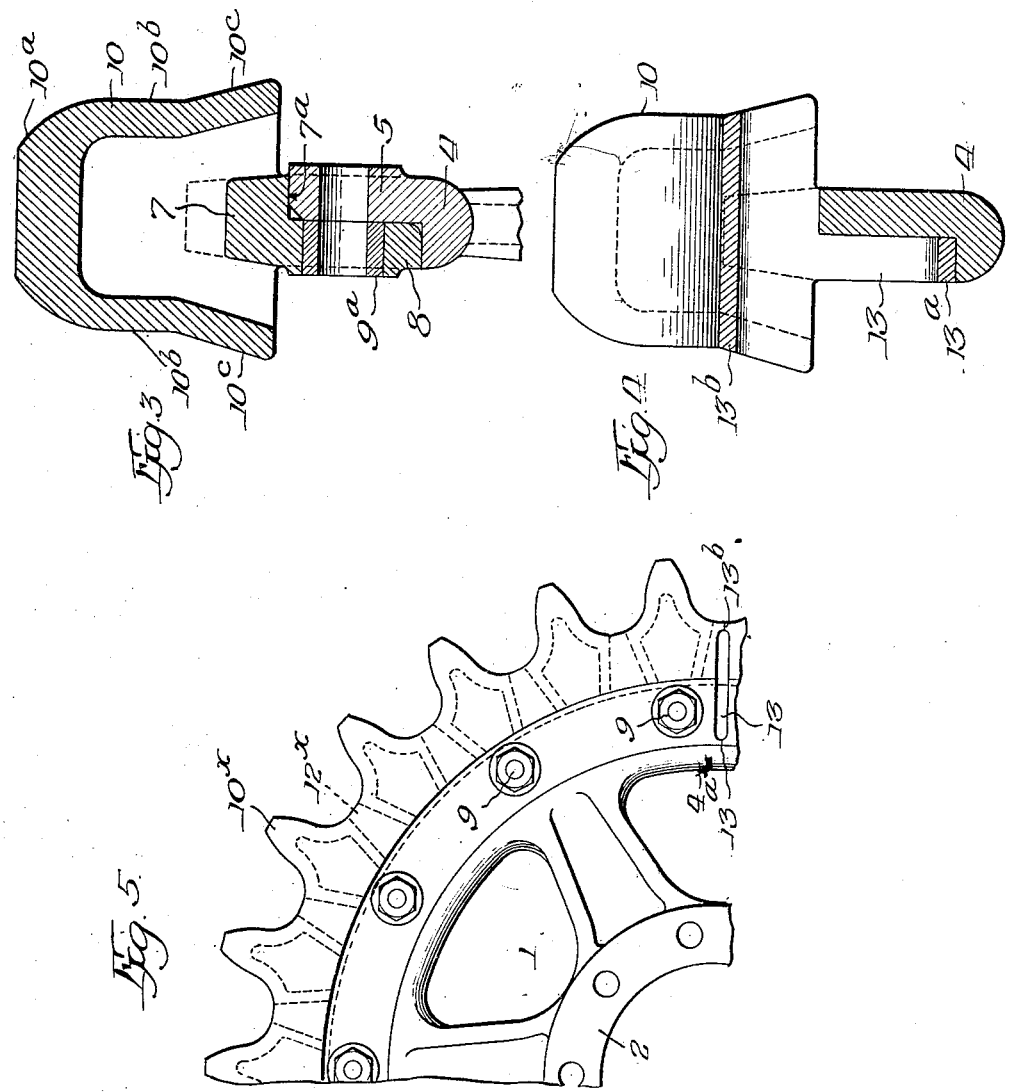

Patented Nov. 3, 1931

1,829,874

UNITED STATES PATENT OFFICE

CLAUDE RORABECK, OF CHICAGO HEIGHTS, ILLINOIS, ASSIGNOR TO AMERICAN MANGANESE STEEL COMPANY, OF CHICAGO, ILLINOIS, A CORPORATION OF MAINE

TRACTOR SPROCKET

Application filed September 28, 1928. Serial No. 308,913.

This invention relates to a sprocket wheel construction which, while adapted for use in many situations, is designed primarily for the caterpillar or endless track tractors of the caterpillar or endless track type where it serves to drive the track which is made up of an endless series of articulated links, the teeth of the sprocket entering the spaces between and interengaging with barrels or sleeves through which the articulating pintles pass, and by such interengagement driving the track.

Sprockets of this kind wear out in the field of use so that it becomes necessary to replace them, and as now constructed the extent to which the tractor has to be dismantled in replacing a sprocket wheel is such that the replacement involves a very large expense in the time required to effect the change; besides the design of the rims of these tractor sprockets, and particularly of the teeth which interengage with the links of the track, has heretofore been objectionable with respect to the manner in which the sprockets and tracks coact; and such sprockets as heretofore constructed have not given full satisfaction with respect to the radial openings which they carry as a means of clearing their intertooth spaces of foreign matter which is carried to them by the tracks.

One object of the present invention is to greatly reduce the expense incident to replacement of driving sprockets, not only with respect to the time that the machine is kept out of use and labor is being expended in making the replacement, but in the cost of the repair parts themselves; and to this end, one feature of the present invention consists in making the rim of the sprocket of a separate part or parts, and with a design which facilitates removal and replacement without disturbing the body of the sprocket wheel, this being accomplished by providing the rim and body, the one with an internal flange and the other with an external flange, which flanges are made to overlap in an intermediate plane of the circumference of the sprocket and being bolted together to secure the rim in place; one form of this part of the invention contemplating the production of the rim in two or more parts, separated in radial planes coincident with the axis of the wheel, or partially severed or weakened in the plane of severance in order that separation can be readily completed by subjecting the rim to shock, wedging action or the like; so that in situations where it is not convenient to slip an entire replaceable rim into position, the rim can be applied in separate pieces, for instance, two pieces each constituting one-half of the rim.

Another object of the invention is to so construct the rim of the sprocket that the teeth will coact with the links of the track more advantageously than sprockets as heretofore constructed; to which end, teeth on the rim are formed with transversely beveled or inwardly flaring bases from which project substantially parallel-sided portions of the teeth, the outer ends of the teeth being suitably rounded to facilitate entering the spaces of the track links, and the construction as a whole being such that the sprocket is self centering in the track, the tooth is thereby made to function with the link at the barrel, and the flaring or beveled bases give the sprocket a much better bearing in the link for side thrust when the sprocket is coming into place from one bearing center to the next.

Another object of the invention is to provide a rim of superior strength with minimum weight; to which end another feature of the invention consists in making the teeth and their bases hollow, but integrally united by a circumferentially extending rail designed to provide an overlapping attaching flange as well as a seating shoulder, and having this rail extend across the hollow flaring bases of the teeth of which it forms an integral part, and from which the flaring side walls of the tooth bases are spaced.

Another object is to improve the self clearing function of the rim to permit the escape of substances carried by the endless track from the ground to the sprocket; to which end, another feature of the invention consists in providing in the inter-tooth spaces, radially extending clearance openings, and having these openings on opposite sides of the medial circumferential plane so that two such openings are provided for each inter-tooth space, and the continuity of the mounting and attaching rail is not interrupted; and these clearance openings are preferably flared inwardly so that foreign matter that is forced into the lower outer ends will pass freely through the openings without chokage.

Finally, a feature of the invention incident to the preferred method of realizing all of the objects, consists in a toothed rim or rim-section for sprocket wheels in which the sides of the hollow teeth and the outer walls of the inter-tooth spaces, which also provide the outer confines of the clearance spaces, constitute continuous skirt-like walls spaced on opposite sides of the integral medial mounting rail but connected together and braced from said rail at regular intervals by walls that constitute the end confines of the clearance spaces, so that a very rigid but relatively light construction is obtained.

In the accompanying drawings—

Figure 1 is a side elevation, and Figure 2 a diametric section of a sprocket wheel embodying one form of the present invention.

Figures 3 and 4 are radial sections in planes coinciding with the axis of the wheel showing detail views of the rim and adjacent portions of the body of the wheel; the section of Figure 3 being taken on the line $3x$—$3x$ and the section of Figure 4 being in the plane of partial severance recess indicated by the line $4x$—$4x$ of Figure 1; and Figure 5 is a side elevation of a sector of the wheel of a somewhat modified design of tooth arrangement.

1 represents the body of the wheel which may have any appropriate design, such, for instance, as a design involving an inner hub-attaching flange 2, spokes 3, and a flange-like felly 4 carrying a rim mounting flange 5; and 6 represents the rim of the wheel constructed with a circumferentially extending rail 7 having a seating shoulder $7a$ and a flange 8 through which it is mounted on the flange 5 of the felly 4 being secured thereto by bolts 9; also teeth 10 and inter-tooth spaces 11. The teeth 10 are made hollow with their cavities presented radially inward and with the integral rim rail 7 extending across their inner open ends. The outer ends of the teeth are preferably rounded, as shown at $10a$, but their side walls extend straight for a portion of the way, as shown at $10b$, and are then beveled or flared outwardly as shown at $10c$, for the purpose of better adapting the tooth to coact with tooth-receiving spaces of a tractor link, insuring more accurate centering of the sprocket in the track composed of such links, and affording a better side thrust bearing between the tooth and the link. The bolt openings in the rim mounting flange 5 are preferably bushed as at $9a$.

The links are further provided with clearance spaces 12 shown by dotted lines in Figure 1 and by full lines at the lower end of Figure 2, which clearance spaces, being two in number, are symmetrically disposed on opposite sides of the mounting rail 7 and add materially to the efficiency of the self clearing function of the rim. The inwardly flaring side walls $10c$ of the tooth bases, and the side walls $12a$ of the clearance spaces 12, constitute continuous apron-like members of the rim which greatly stiffen it against transverse stresses, and these walls are integrally connected together, through the mounting rail 7, by means of the transverse end walls $12b$ of the clearance spaces 12, which may also be said to constitute transverse structural walls of the tooth bases.

The rim is best made by casting as a complete integral structure of manganese steel. But, if it be desired to apply the rim in two parts, it will preferably be divided in a diametric plane coincident with the section line $4x$—$4x$ of Figure 1, and in order that the rim may nevertheless be cast as a single piece, its severance will be through means of slots 13 extending through the rim for the greater part of its radial dimension but leaving the rim united integrally at the points $13a$ and $13b$, thereby insuring production of the rim in perfect form and leaving it intact for handling as an integral member if desired, but in condition for ready separation into two parts in the field by merely driving wedges in the slots 13 and fracturing the piece, which can readily be done since rims of this kind are produced from cast metal, for instance, manganese steel.

According to the embodiment shown in Figure 5, the inter-tooth spaces, instead of being such as to present but one tooth per link as in Figure 1, are greatly reduced so that hollow teeth $10x$ and clearance spaces $12x$ are spaced on centers about equal distances apart, and the rim thus presents two sprocket teeth to each link of the track, thus introducing the principle of what is called the "hunting tooth" action. Otherwise, the rim of Figure 5 may be identical in construction with that described in connection with Figures 1 to 4.

I claim:

1. A rim for sprocket wheels, constructed with walls spaced laterally of the rim and walls spaced circumferentially thereof, providing hollow teeth positioned with their cavities opening inwardly and with an integral mounting rail extending circumferentially of the rim and crossing the cavities of the teeth, but spaced from lateral walls thereof and leaving inwardly presented tooth openings alongside of said rail.

2. A rim for sprocket wheels, constructed with hollow teeth positioned with their cavities opening inwardly and with an integral mounting rail extending circumferentially of the rim and crossing the cavities of the teeth; said rim being also constructed with radial clearance openings in its inter-tooth spaces, which said openings are located on opposite sides of said mounting rail.

3. A rim for sprocket wheels, constructed with hollow teeth having their cavities presented inwardly, and a mounting rail extending circumferentially of the rim and crossing said cavities; the inner portions of the side walls of said teeth being flared toward the center of the wheel.

4. A rim for sprocket wheels, constructed with hollow teeth positioned with their cavities opening inwardly and with an integral mounting rail extending circumferentially of the rim and crossing the cavities of the teeth; said rim being also constructed with radial clearance openings in its inter-tooth spaces, which said openings are located on opposite sides of said mounting rail; the side walls of the teeth and of the clearance openings being flared inwardly.

5. A rim for sprocket wheels, constructed with hollow teeth positioned with their cavities opening inwardly and with an integral mounting rail extending circumferentially of the rim and crossing the cavities of the teeth; said rim being also constructed with radial clearance openings in its inter-tooth spaces, which said openings are located on opposite sides of said mounting rail; the side walls of the hollow teeth and of the clearance openings being integrally united with the mounting rail through means of the end walls of the clearance openings.

6. In a sprocket wheel for receiving link-driving structures, a rim comprising a circumferentially extending attaching member and hollow teeth carried by said attaching member, said teeth comprising walls spaced circumferentially of the rim, and side walls spaced laterally thereof, said walls being shaped to provide laterally flared bases and substantially straight sides extending radially outward from said bases.

7. In a sprocket wheel for link-driving structures, a circumferentially extending mounting rail, hollow teeth mounted upon said rail, said teeth being constructed with bases comprising side walls and transverse walls, and clearance openings on either side of the mounting rail between the teeth, said clearance openings being defined by said mounting rail, said tooth-base end walls, and side walls which are integral with and constitute circumferential continuations from the side walls of the tooth-bases.

Signed at Chicago Heights, Illinois, this 25th day of September, 1928.

CLAUDE RORABECK.